US012345314B2

(12) United States Patent
Maggard

(10) Patent No.: US 12,345,314 B2
(45) Date of Patent: Jul. 1, 2025

(54) MECHANICAL INFINITELY VARIABLE TRANSMISSION FOR OUTDOOR POWER EQUIPMENT

(71) Applicant: MTD PRODUCTS INC, Valley City, OH (US)

(72) Inventor: Jay Maggard, Polk, OH (US)

(73) Assignee: MTD Products Inc, Valley City, OH (US)

( * ) Notice: Subject to any disclaimer, the term of this patent is extended or adjusted under 35 U.S.C. 154(b) by 0 days.

(21) Appl. No.: 18/735,888

(22) Filed: Jun. 6, 2024

(65) Prior Publication Data

US 2024/0410455 A1  Dec. 12, 2024

Related U.S. Application Data

(60) Provisional application No. 63/471,300, filed on Jun. 6, 2023.

(51) Int. Cl.
*F16H 61/662* (2006.01)
*F16H 37/02* (2006.01)
*F16H 59/38* (2006.01)

(52) U.S. Cl.
CPC ........... *F16H 37/022* (2013.01); *F16H 59/38* (2013.01); *F16H 61/662* (2013.01)

(58) Field of Classification Search
CPC ...... F16H 37/022; F16H 59/38; F16H 61/662; F16H 9/14; F16H 37/0846; F16H 2037/088; A01D 34/6806
See application file for complete search history.

(56) References Cited

U.S. PATENT DOCUMENTS

| 4,768,997 A * | 9/1988 | Page | F16H 7/0827 |
| | | | 474/84 |
| 2002/0094911 A1 * | 7/2002 | Haka | F16H 37/0846 |
| | | | 477/211 |
| 2018/0216730 A1 * | 8/2018 | Teramoto | F16H 61/0003 |

FOREIGN PATENT DOCUMENTS

| EP | 0943841 A1 * | 9/1999 | |
| GB | 2457878 A * | 9/2009 | ............ F01P 5/04 |

\* cited by examiner

*Primary Examiner* — Justin Holmes
(74) *Attorney, Agent, or Firm* — Wegman Hessler Valore

(57) ABSTRACT

Mechanical infinitely variable transmissions (IVTs) and vehicles employing such IVTs are discussed. The IVT can comprise a planetary gearset with a sun gear driven based on an input angular velocity and an annulus gear driven based on a combination of the input angular velocity and a variable gear ratio of a pulley system, wherein the variable gear ratio of the pulley system can be electrically controlled by an actuator. A drive element can be driven based on a carrier of the planetary gearset.

20 Claims, 7 Drawing Sheets

EXAMPLE IVT (HOUSING HIDDEN)

EXAMPLE CONTROL UNIT

MECHANICAL INFINITELY VARIABLE TRANSMISSION FOR OUTDOOR POWER EQUIPMENT

CROSS-REFERENCE TO RELATED APPLICATION

This application claims the benefit of U.S. Provisional Application No. 63/471,300, filed Jun. 6, 2023. The latter application as well as the following are hereby incorporated by reference within the present disclosure in their respective entireties and for all purposes: U.S. patent application Ser. No. 16/782,409 filed Feb. 5, 2020, U.S. Provisional Application No. 62/907,992 filed Sep. 30, 2019, U.S. Provisional Application No. 62/801,202 filed Feb. 5, 2019, U.S. Provisional Application No. 63/160,524 filed Mar. 12, 2021, U.S. Provisional Application No. 63/213,646 filed Jun. 22, 2021.

FIELD OF DISCLOSURE

This application relates generally to outdoor power equipment, and more specifically to mechanical infinitely variable transmission employable in connection with outdoor power equipment.

BACKGROUND

Manufacturers of power equipment for outdoor maintenance applications offer many types of machines for general maintenance and mowing applications. Generally, these machines can have a variety of forms depending on application, from general urban or suburban lawn maintenance, rural farm and field maintenance, to specialty applications. Even specialty applications can vary significantly. For example, mowing machines suitable for sporting events requiring moderately precise turf, such as soccer fields or baseball outfields may not be suitable for events requiring very high-precision surfaces such as golf course greens, tennis courts and the like.

Many gas-powered outdoor power equipment employ hydrostatic transmissions to control the drive wheels of the outdoor power equipment. A hydrostatic transmission provides for relatively precise movement at a range of speeds and the ability to transition through the entire range of speeds with a single control (e.g., one lap bar of a pair of lap bars for each drive wheel of a pair of drive wheels, etc.). Hydrostatic transmissions are well regarded among users for the combination of ease of use, precision, and drivability. However, hydrostatic transmissions are controlled mechanically/hydraulically (e.g., through a coupled lap bar, etc.), and are thus not well-suited to be adapted to use in connection with drive-by-wire control systems. Additionally, hydrostatic transmissions can potentially overheat, and require regular maintenance, including periodic replacement of hydraulic fluid.

SUMMARY

The following presents a simplified summary in order to provide a basic understanding of some example aspects of the disclosure. This summary is not an extensive overview. Moreover, this summary is not intended to identify critical elements of the disclosure nor delineate the scope of the disclosure. The sole purpose of the summary is to present some concepts in simplified form as a prelude to the more detailed description that is presented later.

In various embodiments, the subject disclosure provides a mechanical infinitely variable transmission (IVT) that can be employed on gas- or hybrid-powered outdoor power equipment. Various embodiments can employ an IVT as described herein to provide multiple advantages over a hydrostatic transmission, including improved efficiency, the ability to be controlled electrically (e.g., via a drive-by-wire system, etc.), reduced maintenance, and reduced cost.

A first aspect relates to an infinitely variable transmission (IVT), comprising: a planetary gearset comprising a sun gear, two or more planet gears, a carrier, and an annulus gear; an input shaft configured to be rotated by a prime mover at an input angular velocity, wherein the input shaft is configured to drive rotation of the sun gear at a first angular velocity and an input pulley of a pulley system at the first angular velocity, wherein the first angular velocity is based on the input angular velocity; a pulley system comprising the input pulley and an output pulley linked via a belt, wherein one of the input pulley or the output pulley is a variable diameter pulley, and wherein the output pulley is configured to rotate at a second angular velocity, wherein the second angular velocity is based on the first angular velocity and a pulley gear ratio of the pulley system; an actuator configured to receive an input signal and to control a diameter of the variable diameter pulley based on the input signal, wherein the pulley gear ratio is based at least in part on the diameter of the variable diameter pulley; a mixing gear configured to rotate at the second angular velocity, wherein the mixing gear is configured to rotate the annulus gear of the planetary gearset at an annulus angular velocity based on the second angular velocity and a mixing gear ratio between the mixing gear and the outside of the annulus gear, and wherein the carrier is configured to rotate at an output angular velocity that is based on the first angular velocity and the annulus angular velocity; an output gear configured to rotate with the carrier; and a drive element gear coupled to the output gear and configured to be driven by the output gear at a drive angular velocity that is based on the output angular velocity and an output gear ratio between the output gear and the drive element gear, wherein the drive element gear is configured to rotate a drive element at the drive angular velocity.

A second aspect relates to an outdoor power equipment, comprising: a frame; a prime mover; one or more drive elements coupled to the frame; operator controls configured to receive an operator input comprising a first drive input associated with a first drive element of the one or more drive elements; a control unit configured to determine a commanded output based on the first driver input and to output a control signal based at least in part on the commanded output; a first infinitely variable transmission (IVT) coupled to a first drive element of the one or more drive elements, comprising: a planetary gearset comprising a sun gear, two or more planet gears, a carrier, and an annulus gear; an input shaft configured to be rotated by the prime mover at an input angular velocity, wherein the input shaft is configured to drive rotation of the sun gear at a first angular velocity and an input pulley of a pulley system at the first angular velocity, wherein the first angular velocity is based on the input angular velocity; a pulley system comprising the input pulley and an output pulley linked via a belt, wherein one of the input pulley or the output pulley is a variable diameter pulley, and wherein the output pulley is configured to rotate at a second angular velocity, wherein the second angular velocity is based on the first angular velocity and a pulley gear ratio of the pulley system; an actuator configured to receive an input signal and to control a diameter of the variable diameter pulley based on the input signal, wherein the pulley gear ratio is based at least in part on the diameter of the variable diameter pulley; a mixing gear configured to rotate at the second angular velocity, wherein the mixing gear is configured to rotate the annulus gear of the planetary gearset at an annulus angular velocity based on the second angular velocity and a mixing gear ratio between the mixing gear and the outside of the annulus gear, and wherein the carrier is configured to rotate at an output angular velocity that is based on the first angular velocity and the annulus angular velocity an output gear configured to rotate with the carrier; and a drive element gear coupled to the output gear and configured to be driven by the output gear at a drive angular velocity that is based on the output angular velocity and an output gear ratio between the output gear and the drive element gear, wherein the drive element gear is configured to rotate the first drive element at the drive angular velocity.

To accomplish the foregoing and related ends, certain illustrative aspects of the disclosure are described herein in connection with the following description and the drawings. These aspects are indicative, however, of but a few of the various ways in which the principles of the disclosure can be employed and the subject disclosure is intended to include all such aspects and their equivalents. Other advantages and features of the disclosure will become apparent from the following detailed description of the disclosure when considered in conjunction with the drawings.

BRIEF DESCRIPTION OF THE DRAWINGS

The foregoing and other aspects of the present disclosure will become apparent to those skilled in the art to which the present disclosure relates upon reading the following description with reference to the accompanying drawings, in which.

Figure 1:
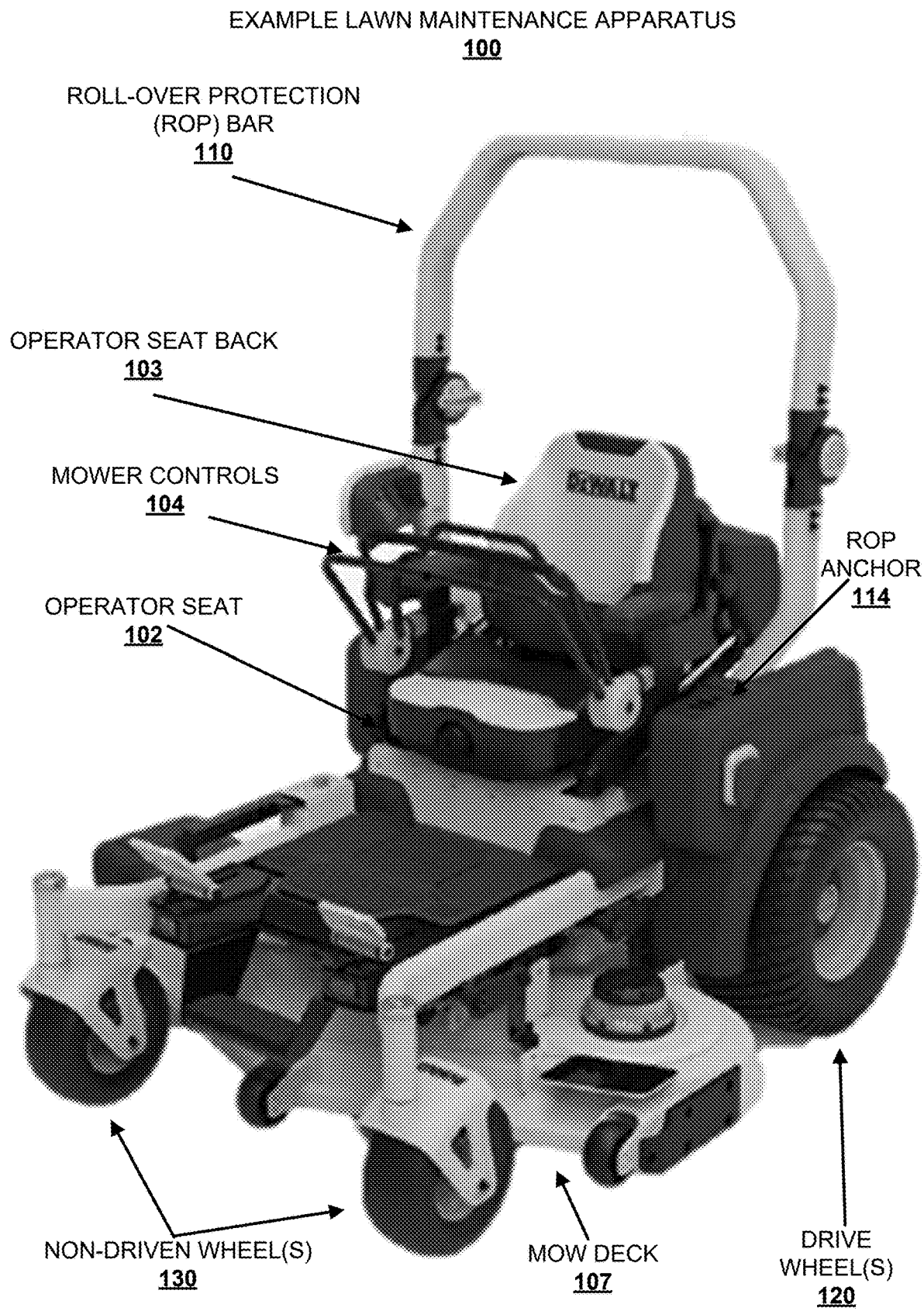
FIG. 1 provides an illustration of a lawn maintenance apparatus as an example outdoor power equipment employable in connection with various aspects discussed herein.

It should be noted that the drawings are diagrammatic and not drawn to scale. Relative dimensions and proportions of parts of the figures have been shown exaggerated or reduced in size for the sake of clarity and convenience in the drawings. The same reference numbers are generally used to refer to corresponding or similar features in the different embodiments, except where clear from context that same reference numbers refer to disparate features. Accordingly, the drawings and description are to be regarded as illustrative in nature and not as restrictive.

While embodiments of the disclosure pertaining to providing an electrically-controllable mechanical infinitely variable transmission (IVT) for an outdoor power equipment are described herein, it should be understood that the disclosed machines, electronic and computing devices and methods are not so limited and modifications may be made without departing from the scope of the present disclosure. The scope of the systems, methods, and electronic and computing devices for providing and/or controlling an IVT are defined by the appended claims, and all devices, processes, and methods that come within the meaning of the claims, either literally or by equivalence, are intended to be embraced therein.

DETAILED DESCRIPTION

Example embodiments that incorporate one or more aspects of the present disclosure are described and illustrated in the drawings. These illustrated examples are not intended to be a limitation on the present disclosure. For example, one or more aspects of the present disclosure can be utilized in other embodiments and even other types of devices. Moreover, certain terminology is used herein for convenience only and is not to be taken as a limitation on the present disclosure. Still further, in the drawings, the same reference numerals are employed for designating the same elements.

As utilized herein, relative terms or terms of degree such as approximately, substantially or like relative terms such as about, roughly and so forth, are intended to incorporate ranges and variations about a qualified term reasonably encountered by one of ordinary skill in the art in fabricating, compiling or optimizing the embodiments disclosed herein to suit design preferences, where not explicitly specified otherwise. For instance, a relative term can refer to ranges of manufacturing tolerances associated with suitable manufacturing equipment (e.g., injection molding equipment, extrusion equipment, metal stamping equipment, and so forth) for realizing a mechanical structure from a disclosed illustration or description. In some embodiments, depending on context and the capabilities of one of ordinary skill in the art, relative terminology can refer to a variation in a disclosed value or characteristic; e.g., a 0 to five-percent variance or a zero to ten-percent variance from precise mathematically defined value or characteristic, or any suitable value or range there between can define a scope for a disclosed term of degree. As examples, a component can be rotated through a disclosed angle or substantially the disclosed angle, such as the disclosed angle with a variance of 0 to five-percent or 0 to ten-percent; a disclosed mechanical dimension can have a variance of suitable manufacturing tolerances as would be understood by one of ordinary skill in the art, or a variance of a few percent about the disclosed mechanical dimension that would also achieve a stated purpose or function of the disclosed mechanical dimension. These or similar variances can be applicable to other contexts in which a term of degree is utilized herein such as accuracy of measurement of a physical effect (e.g., a motor speed, a wheel angle, etc.) or the like.

Referring to FIG. 1, illustrated is an example lawn maintenance apparatus 100 comprising drive wheels 120, in connection with various aspects discussed herein. Although example lawn maintenance apparatuses (e.g., lawn maintenance apparatus 100) are provided for the purpose of illustrating various aspects discussed herein, various embodiments can be or can be employed within or in connection with other outdoor power equipment (e.g., snow thrower(s), etc.). As illustrated in FIG. 1, lawn maintenance apparatus 100 comprises an operator seat 102 and seat back 103 with mower controls 104 on control mounts for controlling powered operations of lawn maintenance apparatus 100

(e.g., drive functions, steering functions, and so forth, whether mechanical, electro-mechanical, hydraulic, pneumatic, or other suitable means of power operation), as well as electronic control or computer functions of lawn maintenance apparatus 100 (e.g., drive-by-wire, stored electronic settings, Global Positioning System (GPS) navigation, operator input controls/output indicators, status input controls/output indicators, and so forth). A mow deck 107 is provided beneath a support structure (e.g., frame, etc.) of lawn maintenance apparatus 100, and in the embodiment depicted by FIG. 1, between the front and rear wheels thereof (although this can vary in some embodiments). Example lawn maintenance apparatus 100 also comprises a footrest for operator comfort and a roll over protection (ROP) bar 110 with a ROP anchor point 114 near to a rear wheel rotation axis of lawn maintenance apparatus 100, which can be substantially aligned with an axis of drive wheels 120. In one or more embodiments, ROP anchor point 114 can be within about 6 inches or less of the axis of drive wheels 120. Steered or dummy non-driven wheels 130 can also be included, as shown at the front of apparatus 100.

In general, an outdoor power equipment such as lawn maintenance apparatus 100 can be powered by any of a variety of means (e.g., engine (e.g., gas, etc.), battery electric, hybrid-electric, etc.). Hydrostatic transmissions are frequently employed in engine-powered and hybrid outdoor power equipment. However, because hydrostatic transmissions are controlled mechanically/hydraulically (e.g., through a coupled lap bar, etc.), they are not well-suited to be adapted to use in connection with drive-by-wire control systems. Additionally, hydrostatic transmissions can potentially overheat and require regular maintenance, including periodic replacement of hydraulic fluid.

Various embodiments comprise a mechanical infinitely variable transmission (IVT) (as well as outdoor power equipment employing one or more such IVT(s)) that can be mechanically driven and electrically controlled. An IVT according to various aspects discussed herein can be employed in place of a hydrostatic transmission in outdoor power equipment, providing multiple advantages over the hydrostatic transmission. IVT(s) discussed herein are controlled electrically, allowing for drive-by-wire control. Embodiments discussed herein can employ a closed-loop control system to precisely control the speed of a drive element driven by an IVT as discussed herein. Additionally, IVT embodiments discussed herein do not require periodic maintenance, unlike hydrostatic transmissions. Moreover, embodiments discussed herein can provide these and other advantages while being less expensive to manufacture (and to maintain, as no periodic maintenance is required) than hydrostatic transmissions.

In various aspects, an IVT as shown and discussed herein receives a rotational input (e.g., from a prime mover) and a control input. The rotational input drives, directly or indirectly, a sun gear of a planetary gearset in a first direction (e.g., clockwise (CW) or counterclockwise (CCW), etc.) and an annulus or ring gear of the planetary gearset in a second direction different than the first direction (e.g., CCW or CW, respectively), and the planetary carrier of that planetary gearset drives a drive element (e.g., a drive wheel of a vehicle comprising the IVT, etc.). One of the sun gear or the annulus gear is driven based on a variable gear ratio (e.g., some embodiments drive the sun gear via a variable gear ratio, while some embodiments such as IVT 200 discussed herein drive the annulus gear via a variable gear ratio) that is controlled (e.g., electrically, electronically, etc.) by a control signal configured to adjust the variable gear ratio to a selected gear ratio within a range of gear ratios. The range of gear ratios comprise: a first range of gear ratios that drive the planetary carrier (and thus the drive element) in a first drive direction (e.g., CW or CCW, such as to move at least that portion of the vehicle forward) at a speed dependent on the variable gear ratio, a second range of gear ratios that drive the planetary carrier (and thus the drive element) in a distinct second drive direction (e.g., CCW or CW, respectively, such as to move at least that portion of the vehicle backward) at a speed dependent on the variable gear ratio, and a neutral gear ratio between the first and second ranges such that the planetary carrier (and thus the drive element) does not rotate when the variable gear ratio of the IVT is at the neutral gear ratio. In various embodiments, the variable gear ratio can be provided via a pulley system comprising a variable pulley (e.g., variable diameter pulley) that can be controlled based on the control signal.

Figure 2:
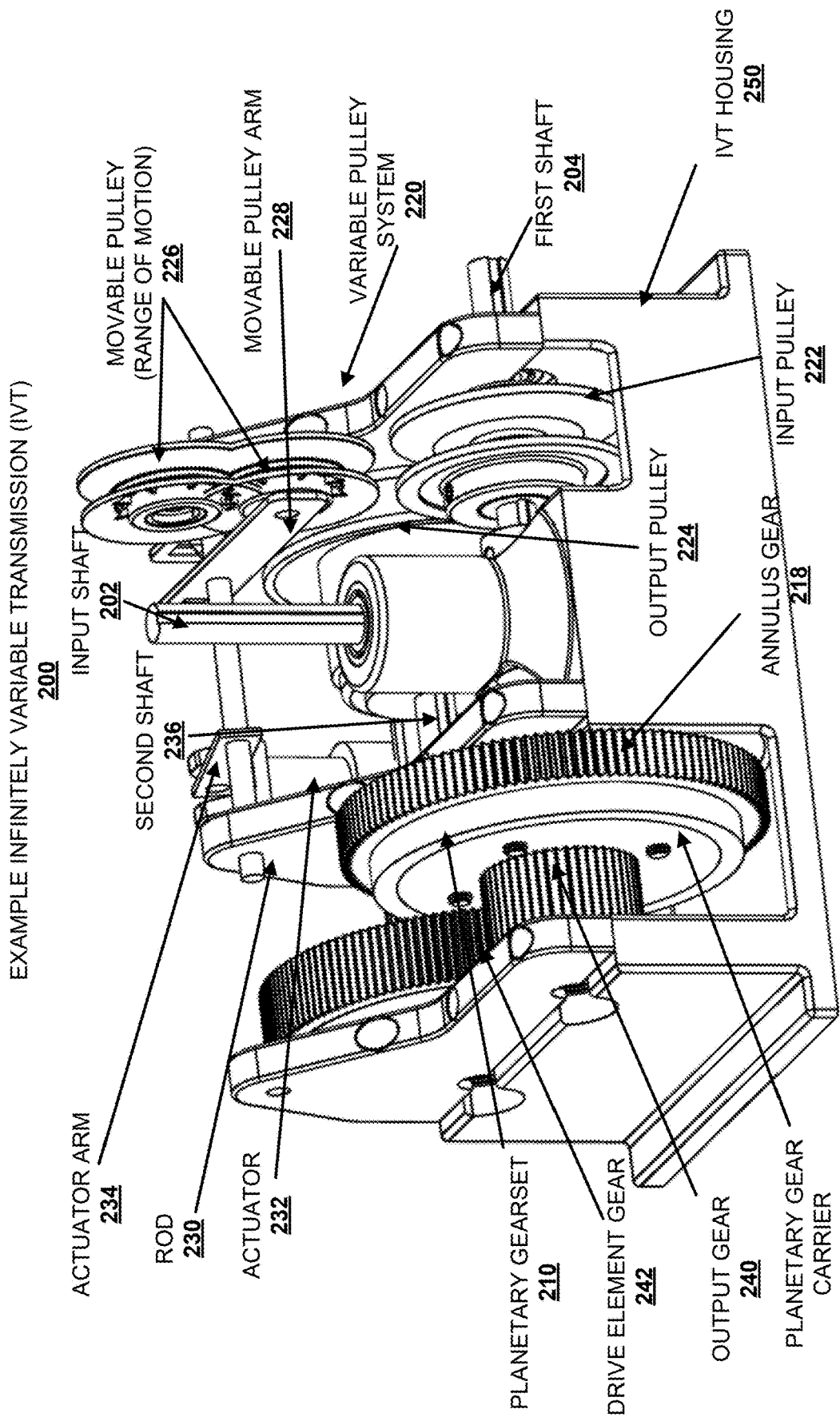
FIG. 2 illustrates a first top perspective view of an example mechanical infinitely variable transmission (IVT), according to various aspects discussed herein.
Figure 3:
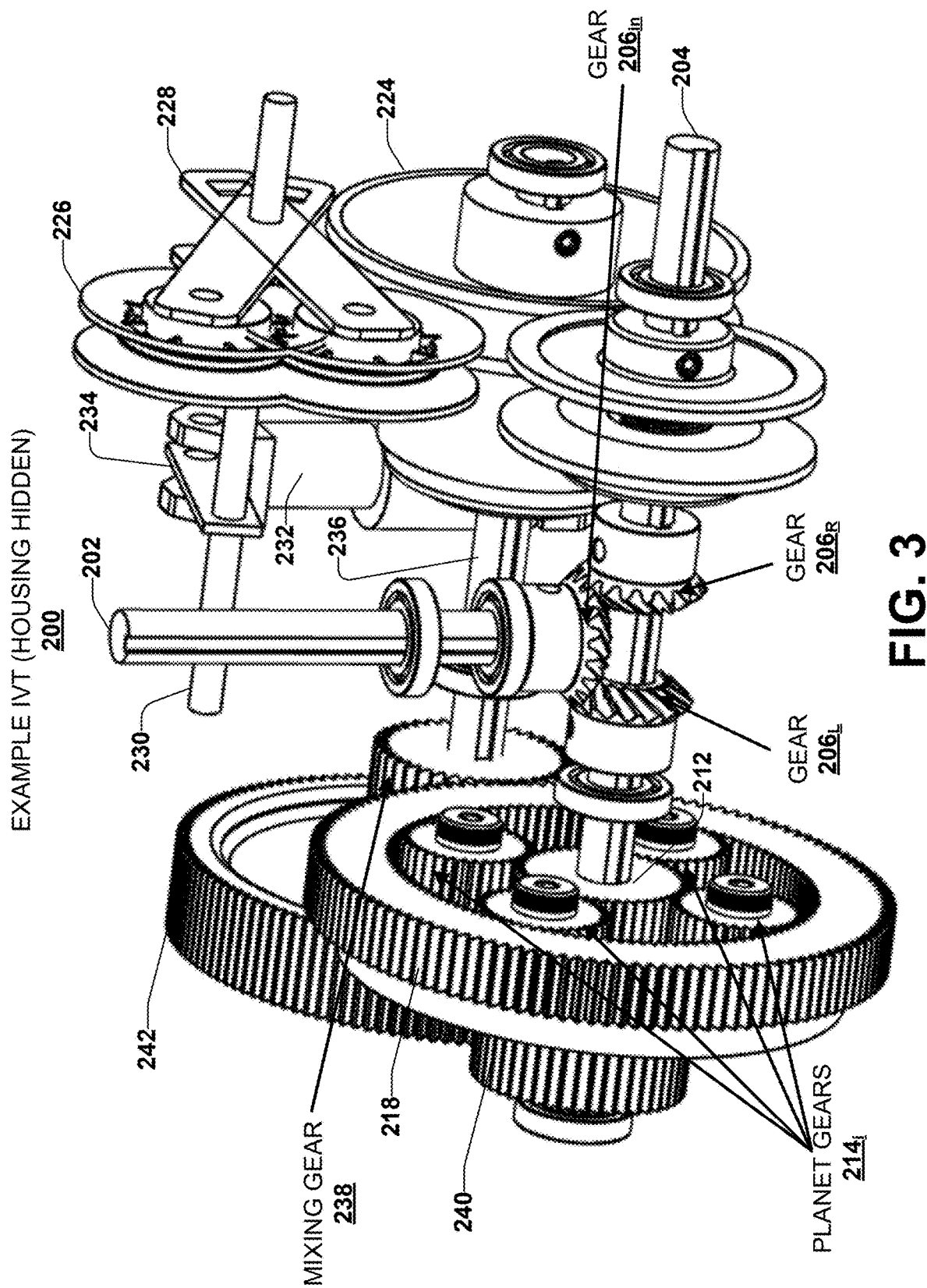
FIG. 3 illustrates a second top perspective view of the IVT of FIG. 2 without its housing, according to various aspects discussed herein.
Figure 4:
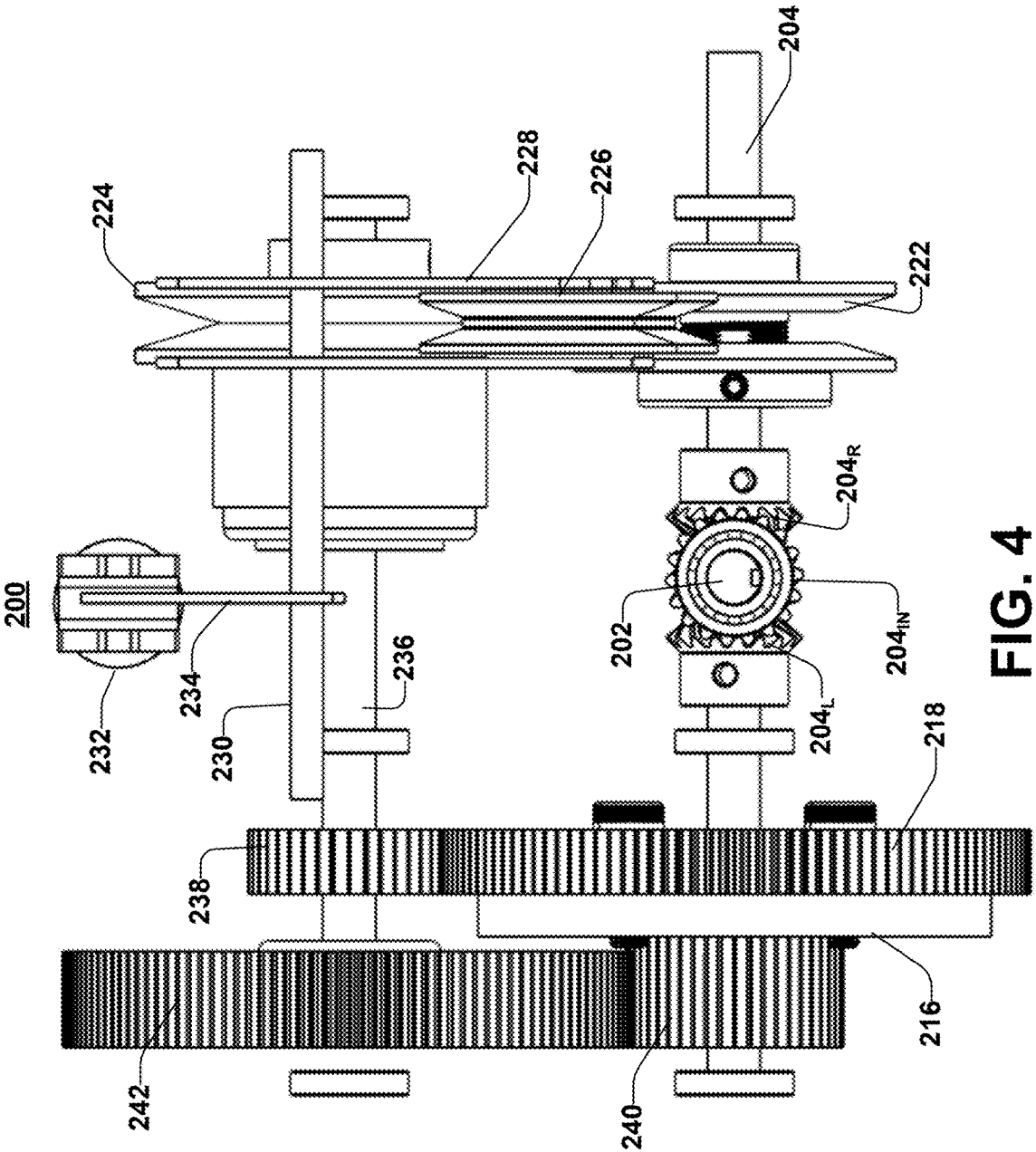
FIG. 4 illustrates a top view of the IVT of FIG. 2 without its housing, according to various aspects discussed herein.
Figure 5:
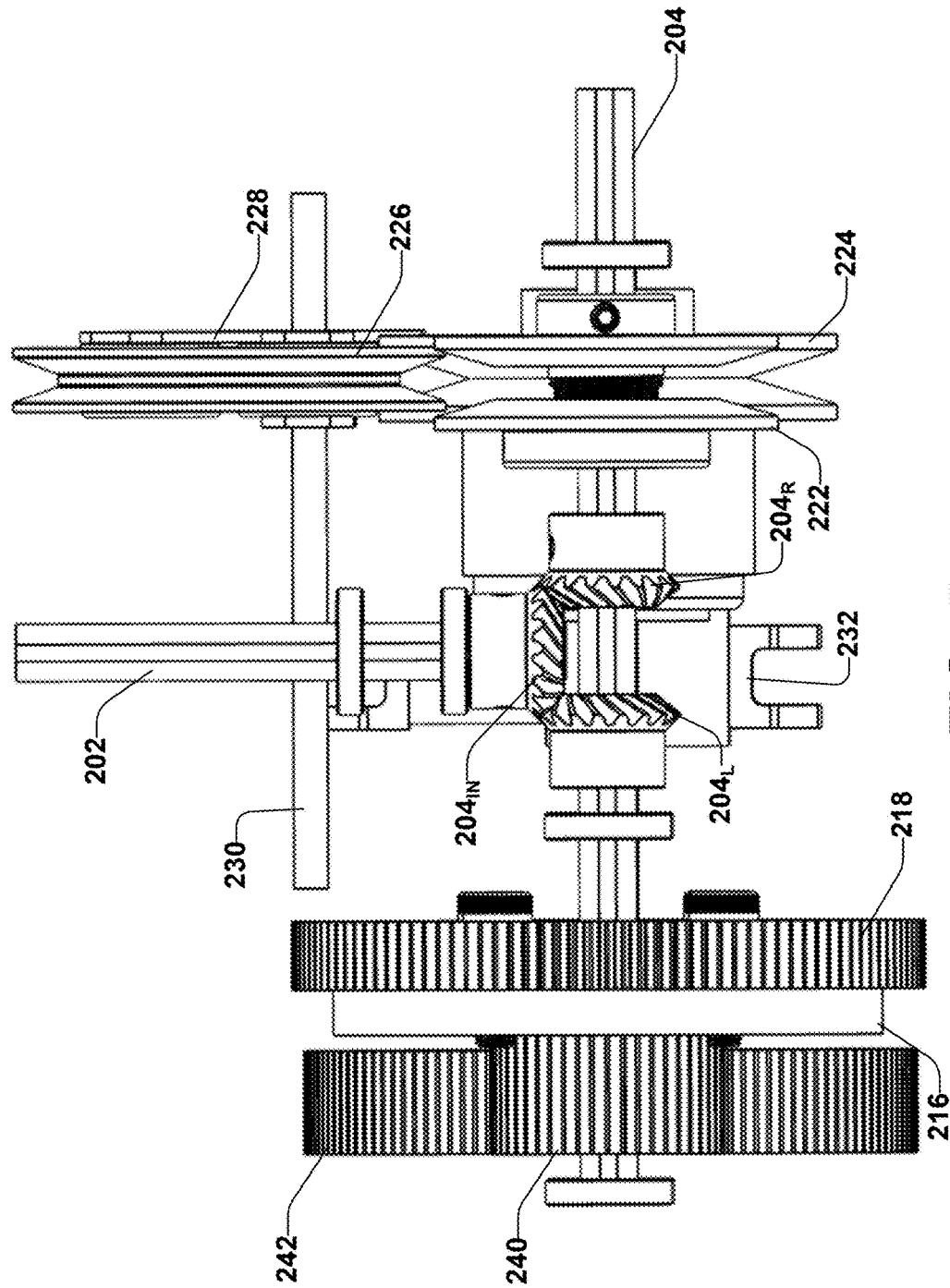
FIG. 5 illustrates a front view of the IVT of FIG. 2 without its housing, according to various aspects discussed herein.

Referring to FIGS. 2-5, illustrated are multiple views of an example mechanical infinitely variable transmission (IVT) 200, according to various aspects discussed herein. FIG. 2 shows a first top perspective view of IVT 200 with IVT housing 250 shown, FIG. 3 shows a second top perspective view of IVT 200 without IVT housing 250, FIG. 4 shows a top view of IVT 200 without IVT housing 250, and FIG. 5 shows a front view of IVT 200 without IVT housing 250, in accordance with various aspects discussed herein. Each of the elements of IVT 200 discussed herein are visible in at least one of FIGS. 2-5, but not all elements of IVT 200 are visible in each of the views of FIGS. 2-5.

IVT 200 is mechanically driven (rotated) by a prime mover (e.g., an engine of lawn maintenance apparatus 100, etc.) via input shaft 202, rotating at an angular velocity $\omega_{in}$. The rotation of input shaft 202 drives rotation of first shaft 204, which is substantially perpendicular to input shaft 202. In IVT 200, first shaft 204 is driven by input shaft 202 via a pair of beveled miter gears $206_{in}$ and either $206_L$ or $206_R$ (shown in FIGS. 3-5), showing two possible positions of a beveled miter gear coupled to $206_{in}$, only one of which is included (for example, $206_L$ can be included in a first IVT driving a left-hand drive element in a vehicle and $206_R$ can be included in a second IVT driving a right-hand drive element in the vehicle (or vice versa), etc.). However, various embodiments can employ any of a variety of other means of driving first shaft 204 via input shaft 202.

On the left side of FIGS. 2-5, rotation of first shaft 204 rotates a sun gear 212 of planetary gearset 210, which comprises sun gear 212, planet gears $214_i$, planetary gear carrier 216, and annulus gear 218. Sun gear 212 has an angular velocity $\omega_s$ equal to the angular velocity $\omega1$ of the first shaft 204, which is at a fixed (for a given embodiment) ratio (dependent on the pair of beveled miter gears $206_{in}$ and either $206_L$, or $206_R$, etc.) to angular velocity $\omega_{in}$ of input shaft 202 and is one of many design choices that can be varied between embodiments (e.g., various gear ratios, etc., discussed herein can be varied between embodiments based on the gears and/or pulleys discussed herein, allowing for a range of different embodiments). In IVT 200, the gear ratio of the miter gear pair $206_{in}$ and $206_L$ or $206_R$ is 1:1, but in various embodiments, other gear ratios can be employed. Sun gear 212 rotates planet gears $214_i$ (example IVT 200 comprises four planet gears $214_1$-$214_4$, but various other embodiments can comprise a greater or lesser number of planetary gears $214_i$) to rotate about their axes with angular velocities $\omega_p$, based on the fixed (for a given embodiment) gear ratio between sun gear 212 and planet gears $214_i$. The angular velocity $\omega c$ of carrier 216 depends on the number of teeth on the sun gear 212 and annulus gear 218, the angular velocity $\omega_s$ of sun gear 212, and the angular velocity $\omega_a$ of annulus gear 218, which depends on pulley system 220 and is discussed in greater detail below.

Output gear 240 is coupled to carrier 218 and rotates with carrier 218 at angular velocity $\omega_c$. Output gear 240 drives drive element gear 242 (and a coupled drive element such as drive wheel 120, a wheel of a tracked system, etc.) at an angular velocity $\omega$out, which is in a fixed ratio (for a given embodiment) with $\omega$e and can be selected for a given embodiment based on, for example, torque and/or speed design goals. In IVT 200, output gear 240 and drive element gear 242 are at a gear ratio of around 3.2:1, but in other embodiments, other gear ratios can be employed.

On the right side of FIGS. 2-5, rotation of first shaft 204 rotates an input pulley 222 of pulley set 220. Input pulley 222 can be coupled (e.g., via a belt, not shown in FIGS. 2-5, etc.) to an output pulley 224, and one of input pulley 222 or output pulley 224 is a variable pulley configured to be controlled based on a control signal (e.g., wherein the diameter of the variable pulley is controllable based on the control signal, etc.). In IVT 200, output pulley 224 is a variable pulley and input pulley 222 is not a variable pulley (e.g., a fixed diameter pulley), but in other embodiments, the input pulley can be a variable pulley and the output pulley can be a non-variable (e.g., fixed diameter) pulley.

In IVT 200, pulley system 220 comprises a third pulley, moveable pulley 226, attached via moveable pulley arm 228 to a rod 230. Actuator 232 is coupled to actuator arm 234 that is also attached to rod 230. Actuator 232 is configured to rotate rod 230 (and thus, moveable pulley 226 via moveable pulley arm 228) via movement of actuator arm 234. Pulley 226 can be moved in either of two directions (e.g., CW or CCW when viewed from a given end of rod 230, etc.) based on rotation of rod 230 by actuator 232 via actuator arm 234.

If pulley 226 is moved in a first direction ("upward" from the perspective of FIGS. 2, 3, and 5), the belt will be pushed inward toward the center of the variable pulley (e.g., output pulley 224 in IVT 200, though in other embodiments, input 222 can be a variable pulley), decreasing the diameter of the variable pulley (e.g., output pulley 224, etc.) and thereby changing the gear ratio of the pulley system 220 as a whole, in terms of the ratio between angular velocity $\omega_1$ of the first shaft 204 (which is also the angular velocity $\omega$s of sun gear 212 and of input pulley 212, both of which rotate with the first shaft 204) and angular velocity $\omega_2$ of the second shaft 236 (which is also the angular velocity of output pulley 224 and of mixing gear 238, which rotate with second shaft 236, but not of drive element gear 242, which freely rotates around second shaft 236, such as via bearings, etc.).

If pulley 226 is moved in a second direction ("downward" from the perspective of FIGS. 2, 3, and 5), the belt will move outward from the center of the variable pulley (e.g., output pulley 224 in IVT 200, though in other embodiments, input 222 can be a variable pulley), increasing the diameter of the variable pulley (e.g., output pulley 224, etc.), again changing the gear ratio (e.g., $R_p$, equaling $\omega_1/\omega_2$) of the pulley system 220 as a whole (in the opposite direction from moving pulley 226 in the first (e.g., "upward") direction).

Although IVT 200 employs movable pulley 226, pulley arm 228, rod 230, actuator 232, and actuator arm 234 to control the gear ratio of pulley system 220, other mechanisms can be employed to control the gear ratio of pulley system 220 in various embodiments, such as controlling an actuator within the variable pulley (e.g., input pulley 222 or output pulley 224) to control the effective diameter of the variable pulley.

Rotation of second shaft 236 causes rotation (at angular velocity $\omega_2$, which can be electrically controlled via an actuator such as actuator 232, as explained above) of coupled (e.g., via spline, key and keyhole, etc.) mixing gear 238. Teeth of mixing gear 238 engage with those on the outside of annulus gear 218, causing annulus gear 218 to rotate at an angular velocity $\omega_a$ that depends on angular velocity $\omega_2$ (controllable via actuator 232, and equaling the pulley system gear ratio $R_p$ times $\omega_1$) and the mixing gear ratio (e.g., $R_m$) between mixing gear 232 and annulus gear 218 (which is fixed for a given embodiment).

Thus, sun gear 212 is driven at angular velocity $\omega_s=\omega_1$, while annulus gear 218 is driven at $\omega_a=R_m R_p \omega_1$, where $R_m$ is fixed for a given embodiment and $R_p$ is electrically controllable (e.g., via actuator 232, etc.). The angular velocity of the planet carrier 216 $\omega_c$ depends on the angular velocities $\omega_s$ and $\omega_a$ of the sun gear 212 and annulus gear 218, respectively, and the number of teeth $N_s$ and $N_a$ on the sun gear 212 and inner side of annulus gear 218, respectively (equations 1):

$$\omega_c = [N_s/(N_s+N_a)]\omega_s + [N_a/(N_s+N_a)]\omega_a = [N_s/(N_s+N_a)]\omega_1 + \quad (1)$$
$$[N_a/(N_s+N_a)]R_m R_p \omega_1 = [(N_s+R_m R_p N_a)/(N_s+N_a)]\omega_1.$$

The terms $N_s$ and $R_m R_p N_a$ have opposite signs ($R_m$ is negative, while all other terms are positive), thus there exists a pulley system gear ratio for which $\omega_c=0$ (equation 2):

$$R_p = -N_s/(R_m N_a). \quad (2)$$

When $\omega_c=0$, the angular velocity of the drive element gear 242 (and thus drive element, e.g., drive wheel 120, etc.), which is in a fixed ratio $R_{out}$ (for a given embodiment) to the angular velocity of output gear 240, which is also zero (output gear 240 rotates with planetary gear carrier 216 at $\omega_c$).

In various embodiments, various design parameters of an IVT as discussed herein (e.g., fixed gear ratios, range of potential gear ratios of the pulley system, etc.) can be selected such that the values of $N_s$, $N_a$, and $R_m$ and the range of possible values of $R_p$ give a range of possible values of $\omega_c$ that comprise a first range of negative values (wherein the drive element rotates in a first direction at a speed proportional to $\omega_c$), a second range of positive values (wherein the drive element rotates in a second direction (the opposite of the first direction) at a speed proportional to $\omega_c$) and a neutral value, 0, between the first range and the second range (wherein the drive element rotates does not rotate).

Because of the mechanical design of IVT 200 and other IVTs according to various embodiments described herein, a relatively high amount of torque (the exact amount depending on various design choices discussed herein, such as the gear ratio between output gear 240 and drive element gear 242) is applied to rotate a drive element (e.g., drive wheel 120, etc.) even at very small non-zero speeds. As such, without precise control over speed, a vehicle employing an IVT according to aspects discussed herein may slowly move forward or backward when an operator intends to command a zero speed.

However, because IVTs discussed herein can be controlled electrically (e.g., via an actuator such as actuator 232), closed loop feedback can be employed to ensure that output speed(s) closely match the speed(s) commanded via input signal(s) (e.g., from an operator sitting or standing on a vehicle employing the IVT; a remote operator; a control signal generated by a control unit, etc., for autonomous or semi-autonomous driving; etc.). In various embodiments, one or more sensors can be employed to determine a speed/velocity (e.g., angular velocity, ground speed, etc.) of a component of an IVT as described herein or a drive element driven by an IVT as described herein. Examples include sensing/measuring the angular velocity of one or more of a planetary gear carrier (e.g., carrier 216, etc.), an output gear (e.g., output gear 240, etc.), a drive element gear (e.g., drive element gear 242, etc.), a drive element (e.g., drive wheel 120, etc.) driven by a drive element gear 242 (e.g., drive element gear 242, etc.); sensing/measuring a ground speed of a portion of a vehicle comprising such an IVT near a drive element driven by the IVT; etc.

Figure 6:
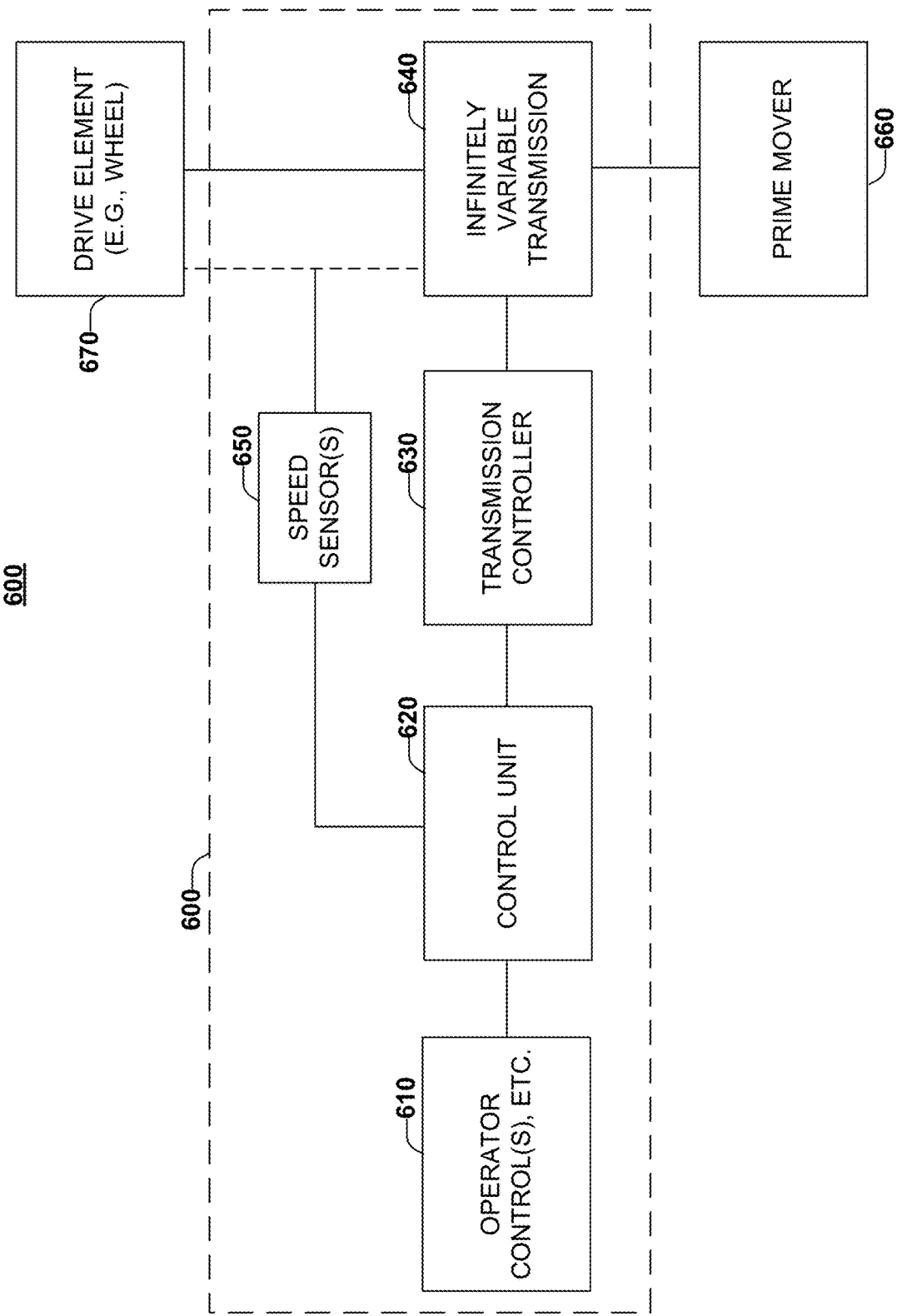
FIG. 6 illustrates an example IVT control system, according to various aspects discussed herein.

Referring to FIG. 6, illustrated is an example IVT control system 600, according to various aspects discussed herein. An input signal can be received as input by an operator via operator controls 610 (e.g., controls local to a vehicle comprising the IVT, remote controls, etc.), for example based on position(s) of operator control(s), etc.

Based on the input signal, a control unit 620 can determine a commanded output, such as an angular velocity of a planetary gear carrier, an output gear, a drive element gear, a drive element, etc. Alternatively, in embodiments employing autonomous or semi-autonomous driving, the commanded output can be determined in an autonomous or semi-autonomous manner that can be based at least in part on, or can be independent of, operator input(s) (in some embodiments wherein the commanded output is independent of operator input(s), operator control(s) 610 can be optional). As discussed in greater detail below, the control signal can also be based at least in part on feedback received via one or more speed sensors 650.

Based on the commanded output, control unit 620 can generate a control signal that can be provided to a transmission controller 630, which can control an actuator of IVT 640 to vary a gear ratio of a pulley system of IVT 640 to obtain the commanded output (e.g., rotating one of a carrier, output gear, drive element gear, drive element, etc. at a commanded angular velocity, etc.). IVT 640 can also be driven by rotation from a prime mover 660 (not part of control system 600).

Based on the rotation from prime mover 660 and the gear ratio controlled via transmission controller 630, IVT 640 can rotate a drive element 670 (not part of control system 600) at an actual output speed.

One or more speed sensors 650 can be included in system 600, and can sense/measure one or more angular velocities and/or ground speed(s), such as an angular velocity of a planetary gear carrier, an output gear, a drive element gear, a drive element, etc. Speed sensor(s) 650 can output the one or more sensed/measured angular velocities and/or ground speeds to control unit 620. Control unit 620 can compare the one or more sensed/measured angular velocities and/or ground speeds to the commanded output (e.g., if the commanded output is a target angular velocity of an output gear and the sensed angular velocity is of the drive element gear, an angular velocity of the drive element gear corresponding to the target angular velocity of the output gear can be determined and compared to the sensed angular velocity of the drive element gear, etc.). Based on the comparison between the one or more sensed/measured angular velocities and/or ground speeds and the commanded output, the control signal can be adjusted or not as appropriate to ensure the one or more sensed/measured angular velocities and/or ground speeds correspond to the commanded output (e.g., if the commanded output is zero angular velocity for the output gear and the sensed angular velocity indicates or corresponds to forward rotation of the output gear, the control signal can be adjusted to ensure the output gear does not rotate, etc.).

Figure 7:
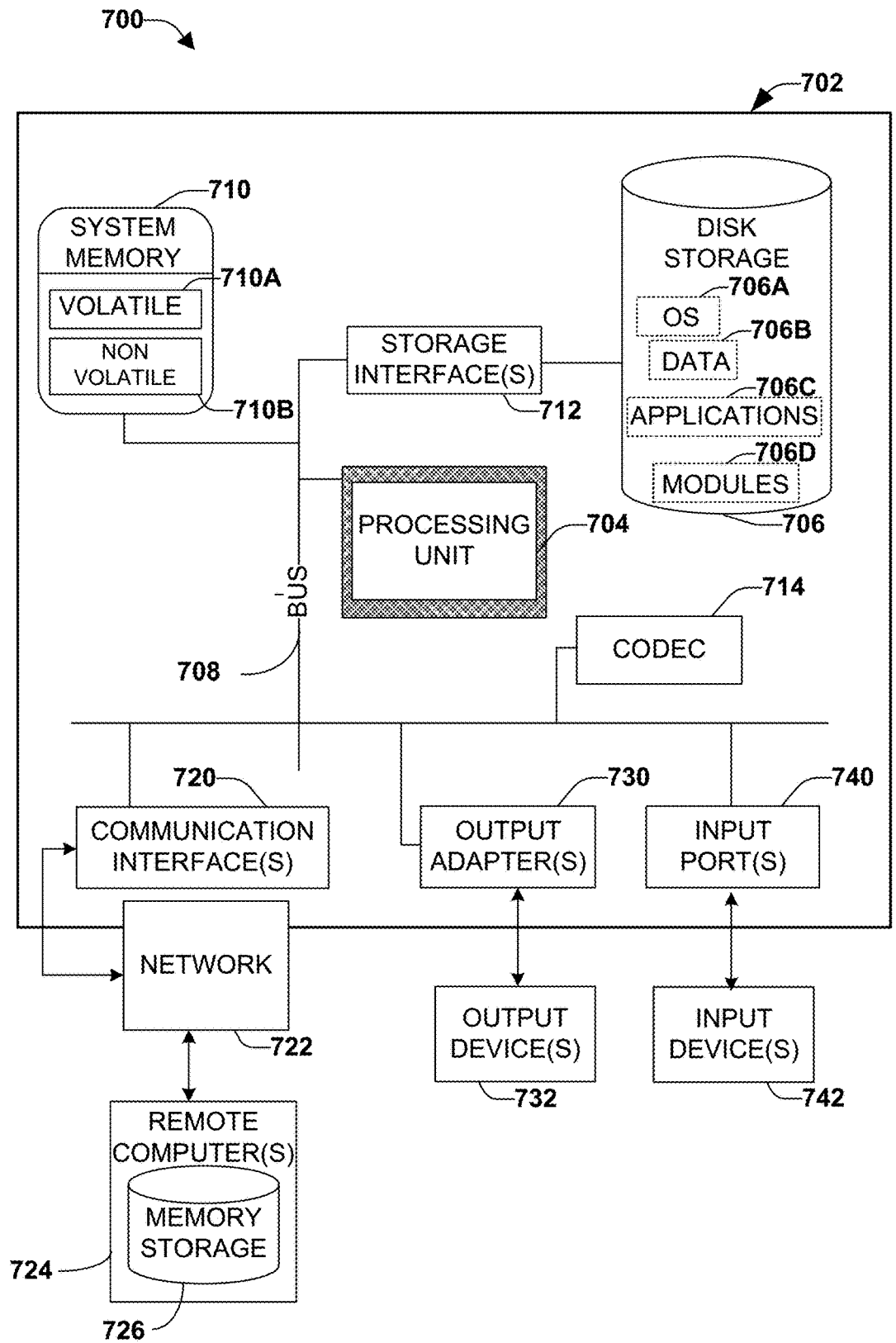
FIG. 7 illustrates a block diagram of an example control unit operable in conjunction with one or more aspects of the present disclosure.

In connection with FIG. 7, the systems and processes described herein can be embodied within hardware, such as a single integrated circuit (IC) chip, multiple ICs, an application specific integrated circuit (ASIC), or the like. A suitable control unit 700 for implementing various aspects of the claimed subject matter includes a computer 702. In various embodiments, a control unit of a vehicle can be embodied in part by computer 702, or an analogous computing device known in the art, subsequently developed, or made known to one of ordinary skill in the art by way of the context provided herein.

The computer 702 can include a processing unit 704, a system memory 710, a codec 714, and a system bus 708. The system bus 708 couples system components including, but not limited to, the system memory 710 to the processing unit 704. The processing unit 704 can be any of various available processors. Dual microprocessors and other multiprocessor architectures also can be employed as the processing unit 704.

The system bus 708 can be any of several types of bus structure(s) including the memory bus or memory controller, a peripheral bus or external bus, or a local bus using any variety of available bus architectures including, but not limited to, Controller Area Network (CAN), Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCMCIA), Firewire (IEEE 1394), and Small Computer Systems Interface (SCSI).

The system memory 710 can include volatile memory 710A, non-volatile memory 710B, or both. Operating instructions of a control unit (among other control units: 620, etc., depicted herein) described in the present specification can be loaded into system memory 710, in various embodiments, upon startup of computer 702. The basic input/output system (BIOS), containing the basic routines to transfer information between elements within the computer 702, such as during start-up, is stored in non-volatile memory 710B. In addition, according to present innovations, codec 714 may include at least one of an encoder or decoder, wherein the at least one of the encoder or decoder may consist of hardware, software, or a combination of hardware and software. Although, codec 714 is depicted as a separate component, codec 714 may be contained within non-volatile memory 710B. By way of illustration, and not limitation, non-volatile memory 710B can include read only memory (ROM), programmable ROM (PROM), electrically programmable ROM (EPROM), electrically erasable programmable ROM (EEPROM), or Flash memory. Non-volatile memory 710B can be embedded memory (e.g., physically integrated with computer 702 or a mainboard thereof), or removable memory. Examples of suitable removable memory can include a secure digital (SD) card, a compact Flash (CF) card, a universal serial bus (USB) memory stick, or the like. Volatile memory 710A includes random access memory (RAM), which can serve as operational system memory for applications executed by processing unit 704.

By way of illustration and not limitation, RAM is available in many forms such as static RAM (SRAM), dynamic RAM (DRAM), synchronous DRAM (SDRAM), double data rate SDRAM (DDR SDRAM), and enhanced SDRAM (ESDRAM), and so forth.

Computer 702 may also include removable/non-removable, volatile/non-volatile computer storage medium. FIG. 7 illustrates, for example, disk storage 706. Disk storage 706 includes, but is not limited to, devices such as a magnetic disk drive, solid state disk (SSD) floppy disk drive, tape drive, Flash memory card, memory stick, or the like. In addition, disk storage 706 can include storage medium separately or in combination with other storage medium including, but not limited to, an optical disk drive such as a compact disk ROM device (CD-ROM) or derivative technology (e.g., CD-R Drive, CD-RW Drive, DVD-ROM, and so forth). To facilitate connection of the disk storage 706 to the system bus 708, a removable or non-removable interface is typically used, such as interface 712. In one or more embodiments, disk storage 706 can be limited to solid state non-volatile storage memory, providing motion and vibration resistance for a control unit (e.g., control unit 620, among others) operable in conjunction with a vehicle (e.g., lawn maintenance apparatus 100, etc.).

It is to be appreciated that FIG. 7 describes software stored at non-volatile computer storage media (e.g., disk storage 706) utilized to operate a disclosed control unit 700 to control a mechanical IVT of a vehicle (e.g., lawn maintenance apparatus 100 disclosed hereinabove). Such software includes an operating system 706A. Operating system 706A, which can be stored on disk storage 706, acts to control and allocate resources of the computer 702. Applications 706C take advantage of the management of resources by operating system 706A through program modules 706D, and program data 706B, such as the boot/shutdown transaction table and the like, stored either in system memory 710 or on disk storage 706. It is to be appreciated that the claimed subject matter can be implemented with various operating systems or combinations of operating systems.

Input device(s) 742 connects to the processing unit 704 and facilitates user interaction with control unit 700 through the system bus 708 via interface port(s) 730. Input port(s) 740 can include, for example, a serial port, a parallel port, a game port, a universal serial bus (USB), among others. Output device(s) 732 use some of the same type of ports as input device(s) 742. Thus, for example, a USB port may be used to provide input to computer 702 and to output information from computer 702 to an output device 732. Output adapter 730 is provided to illustrate that there are some output devices, such as graphic display, speakers, and printers, among other output devices, which require special adapters. The output adapter 730 can include, by way of illustration and not limitation, video and sound cards that provide a means of connection between the output device 732 and the system bus 708. It should be noted that other devices or systems of devices provide both input and output capabilities such as remote computer(s) 724 and memory storage 726.

Computer 702 can operate in conjunction with one or more electronic devices described herein. For instance, computer 702 can facilitate steering of non-driven wheels and/or driving of driven wheels, as described herein. Additionally, computer 702 can communicatively couple with a controller of an actuator controlling a gear ratio of a pulley system comprising a variable pulley, according to one or more aspects discussed herein.

Communication connection(s) 720 refers to the hardware/software employed to connect the network interface 722 to the system bus 708. While communication connection 720 is shown for illustrative clarity inside computer 702, it can also be external to computer 702. The hardware/software necessary for connection to the network interface 722 includes, for exemplary purposes only, internal and external technologies such as, modems including regular telephone grade modems, cable modems and DSL modems, ISDN adapters, and wired and wireless Ethernet cards, hubs, and routers.

In regard to the various functions performed by the above described components, machines, devices, processes and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the embodiments. In this regard, it will also be recognized that the embodiments include a system as well as electronic hardware configured to implement the functions, or a computer-readable medium having computer-executable instructions for performing the acts or events of the various processes.

In addition, while a particular feature may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

In other embodiments, combinations or sub-combinations of the above disclosed embodiments can be advantageously made. The block diagrams of the architecture and flow charts are grouped for ease of understanding. However, it should be understood that combinations of blocks, additions of new blocks, re-arrangement of blocks, and the like are contemplated in alternative embodiments of the present disclosure.

It is also understood that the examples and embodiments described herein are for illustrative purposes only and that various modifications or changes in light thereof will be suggested to persons skilled in the art and are to be included within the spirit and purview of this application and scope of the appended claims.

What is claimed is:

1. An infinitely variable transmission (IVT), comprising:
   a planetary gearset comprising a sun gear, two or more planet gears, a carrier, and an annulus gear;
   an input shaft configured to be rotated by a prime mover at an input angular velocity, wherein the input shaft is configured to drive rotation of the sun gear at a first angular velocity and an input pulley of a pulley system at the first angular velocity, wherein the first angular velocity is based on the input angular velocity;
a pulley system comprising the input pulley and an output pulley linked via a belt, wherein one of the input pulley or the output pulley is a variable diameter pulley, and wherein the output pulley is configured to rotate at a second angular velocity, wherein the second angular velocity is based on the first angular velocity and a pulley gear ratio of the pulley system;
an actuator configured to receive an input signal and to control a diameter of the variable diameter pulley based on the input signal, wherein the pulley gear ratio is based at least in part on the diameter of the variable diameter pulley;
a mixing gear configured to rotate at the second angular velocity, wherein the mixing gear is configured to rotate the annulus gear of the planetary gearset at an annulus angular velocity based on the second angular velocity and a mixing gear ratio between the mixing gear and the outside of the annulus gear, and wherein the carrier is configured to rotate at an output angular velocity that is based on the first angular velocity and the annulus angular velocity;
an output gear configured to rotate with the carrier; and
a drive element gear coupled to the output gear and configured to be driven by the output gear at a drive angular velocity that is based on the output angular velocity and an output gear ratio between the output gear and the drive element gear, wherein the drive element gear is configured to rotate a drive element at the drive angular velocity.

2. The IVT of claim 1, wherein the pulley gear ratio ranges between a maximum pulley gear ratio and a minimum pulley gear ratio, wherein when the pulley gear ratio is the maximum pulley gear ratio the output angular velocity is a first maximum output angular velocity in a first direction, wherein when the pulley gear ratio is the minimum pulley gear ratio the output angular velocity is a second maximum output angular velocity in a second direction that is different than the first direction.

3. The IVT of claim 1, wherein the input shaft is configured to drive a first shaft at the first angular velocity, and wherein the sun gear and the input pulley are coupled to and rotate with the first shaft.

4. The IVT of claim 1, wherein the first angular velocity has a first magnitude, and wherein the input angular velocity has the first magnitude.

5. The IVT of claim 1, wherein the variable diameter pulley comprises the actuator.

6. The IVT of claim 1, wherein the pulley system comprises a moveable pulley, and wherein the actuator is configured to control the diameter of the variable diameter pulley by moving the moveable pulley.

7. The IVT of claim 6, wherein the actuator is coupled to a rod via an actuator arm, wherein the moveable pulley is coupled to the rod via a pulley arm, and wherein the actuator is configured to move the moveable pulley by rotating the rod.

8. The IVT of claim 1, wherein the second angular velocity is the product of the first angular velocity and the pulley gear ratio.

9. The IVT of claim 1, wherein the variable diameter pulley is the output pulley.

10. The IVT of claim 1, wherein the variable diameter pulley is the input pulley.

11. The IVT of claim 1, wherein the annulus angular velocity is the product of the second angular velocity and the mixing gear ratio.

12. The IVT of claim 1, wherein the output pulley and the mixing gear are coupled to and rotate with a first shaft.

13. The IVT of claim 1, further comprising a speed sensor configured to sense a sensed angular velocity of one of the carrier, the output gear, or the drive element gear, wherein the speed sensor is further configured to output the sensed angular velocity.

14. An outdoor power equipment, comprising:
a frame;
a prime mover;
one or more drive elements coupled to the frame;
operator controls configured to receive an operator input comprising a first drive input associated with a first drive element of the one or more drive elements;
a control unit configured to determine a commanded output based on the first driver input and to output a control signal based at least in part on the commanded output;
a first infinitely variable transmission (IVT) coupled to a first drive element of the one or more drive elements, comprising:
a planetary gearset comprising a sun gear, two or more planet gears, a carrier, and an annulus gear;
an input shaft configured to be rotated by the prime mover at an input angular velocity, wherein the input shaft is configured to drive rotation of the sun gear at a first angular velocity and an input pulley of a pulley system at the first angular velocity, wherein the first angular velocity is based on the input angular velocity;
a pulley system comprising the input pulley and an output pulley linked via a belt, wherein one of the input pulley or the output pulley is a variable diameter pulley, and wherein the output pulley is configured to rotate at a second angular velocity, wherein the second angular velocity is based on the first angular velocity and a pulley gear ratio of the pulley system;
an actuator configured to receive an input signal and to control a diameter of the variable diameter pulley based on the input signal, wherein the pulley gear ratio is based at least in part on the diameter of the variable diameter pulley;
a mixing gear configured to rotate at the second angular velocity, wherein the mixing gear is configured to rotate the annulus gear of the planetary gearset at an annulus angular velocity based on the second angular velocity and a mixing gear ratio between the mixing gear and the outside of the annulus gear, and wherein the carrier is configured to rotate at an output angular velocity that is based on the first angular velocity and the annulus angular velocity;
an output gear configured to rotate with the carrier; and
a drive element gear coupled to the output gear and configured to be driven by the output gear at a drive angular velocity that is based on the output angular velocity and an output gear ratio between the output gear and the drive element gear, wherein the drive element gear is configured to rotate the first drive element at the drive angular velocity.

15. The outdoor power equipment of claim 14, further comprising a speed sensor configured to sense a sensed angular velocity of one of the carrier, the output gear, or the drive element gear, wherein the speed sensor is further configured to output the sensed angular velocity to the control unit.

16. The outdoor power equipment of claim 14, wherein the control unit is configured to generate the control signal based at least in part on the sensed angular velocity.

17. An infinitely variable transmission (IVT), comprising:
a planetary gearset comprising a sun gear having a number of teeth $N_s$, a set of planet gears, a carrier, and an annulus gear having a number of teeth $N_a$;
an input shaft configured to be rotated by a prime mover at an input angular velocity, wherein the input shaft is configured to drive rotation of the sun gear at a first angular velocity, $\omega_1$, and an input pulley of a pulley system at the first angular velocity, wherein the first angular velocity is a fixed ratio of the input angular velocity;
a pulley system comprising the input pulley and an output pulley operationally engaged to the input pulley to be driven thereby, wherein one of the input pulley or the output pulley is a variable diameter pulley, and wherein the output pulley is configured to rotate at a second angular velocity, wherein the second angular velocity is based on the first angular velocity and a pulley gear ratio, $R_p$, of the pulley system;
an actuator configured to receive an input signal and to control a diameter of the variable diameter pulley based on the input signal, wherein the pulley gear ratio, $R_p$, is based at least in part on the diameter of the variable diameter pulley;
a mixing gear configured to rotate at the second angular velocity, wherein the mixing gear is configured to rotate the annulus gear of the planetary gearset at an annulus angular velocity based on the second angular velocity and a mixing gear ratio, $R_m$, between the mixing gear and the outside of the annulus gear, and wherein the carrier is configured to rotate at an angular velocity de equal to $[(N_s+R_mR_pN_a)/(N_s+N_a)]\omega_1$.

18. The IVT of claim 17, wherein there exists a pulley system gear ratio for which $\omega_c=0$.

19. The IVT of claim 18, further comprising
an output gear configured to rotate with the carrier; and
a drive element gear coupled to the output gear and configured to be driven by the output gear at a drive angular velocity that is based on the output angular velocity and an output gear ratio between the output gear and the drive element gear, wherein the drive element gear is configured to rotate a drive element at the drive angular velocity.

20. The IVT of claim 19, wherein the pulley system comprises a moveable pulley, and wherein the actuator is configured to control the diameter of the variable diameter pulley by moving the moveable pulley.

* * * * *